United States Patent
Fukui

(10) Patent No.: US 7,636,123 B2
(45) Date of Patent: Dec. 22, 2009

(54) IMAGE CAPTURING APPARATUS WITH LIGHT EMISSION CONTROLLING MECHANISM AND METHOD OF CONTROLLING THE IMAGE CAPTURING APPARATUS

(75) Inventor: Hajime Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 601 days.

(21) Appl. No.: 10/540,416

(22) PCT Filed: Apr. 26, 2005

(86) PCT No.: PCT/JP2005/008377

§ 371 (c)(1),
(2), (4) Date: Jun. 24, 2005

(87) PCT Pub. No.: WO2006/117874

PCT Pub. Date: Nov. 9, 2006

(65) Prior Publication Data

US 2007/0052821 A1 Mar. 8, 2007

(51) Int. Cl.
H04N 5/222 (2006.01)
H04N 5/235 (2006.01)
G03B 7/00 (2006.01)

(52) U.S. Cl. .................... 348/370; 348/371; 348/362

(58) Field of Classification Search ............... 348/345, 348/348–350, 362, 366, 370–371
See application file for complete search history.

(56) References Cited

U.S. PATENT DOCUMENTS

| 6,904,233 | B2 | 6/2005 | Fukui | |
|---|---|---|---|---|
| 2003/0071908 | A1* | 4/2003 | Sannoh et al. | 348/345 |
| 2004/0207743 | A1* | 10/2004 | Nozaki et al. | 348/333.12 |
| 2005/0062856 | A1* | 3/2005 | Matsushita | 348/222.1 |

FOREIGN PATENT DOCUMENTS

| CN | 1525234 A | 9/2004 |
|---|---|---|
| CN | 1591157 A | 3/2005 |
| JP | 2001-091989 | 4/2001 |
| JP | 2001-201782 | 7/2001 |

(Continued)

OTHER PUBLICATIONS

International Search Report dated Jan. 24, 2006.

(Continued)

*Primary Examiner*—Kelly L Jerabek
(74) *Attorney, Agent, or Firm*—Cowan, Liebowitz & Latman, P.C.

(57) ABSTRACT

This invention has as its object to precisely detect the face of a person from a captured image even in a situation with an insufficient brightness (e.g., when an image of a person is to be photographed to have a nightscape as a background). To this end, an image capturing apparatus detects, on the basis of a captured image based on pre-light emission, a face area in the captured image, determines a light control area of a flash in the captured image including an object in accordance with the detected face area, calculates a main light emitting amount in accordance with a photometry value based on the pre-light emission in the determined light control area, and photographs an image by controlling the flash on the basis of the calculated main light emitting amount.

17 Claims, 12 Drawing Sheets

FOREIGN PATENT DOCUMENTS

| | | |
|---|---|---|
| JP | 2003-98580 | 4/2003 |
| JP | 2003-107555 | 4/2003 |
| JP | 2003-107567 | 4/2003 |
| JP | 2004-153315 | 5/2004 |
| JP | 2004-320287 | 11/2004 |

OTHER PUBLICATIONS

Notification of the First Office Action issued by the Patent Office of the People's Republic of China, dated Mar. 7, 2008 (with English translation).

* cited by examiner

F I G. 12
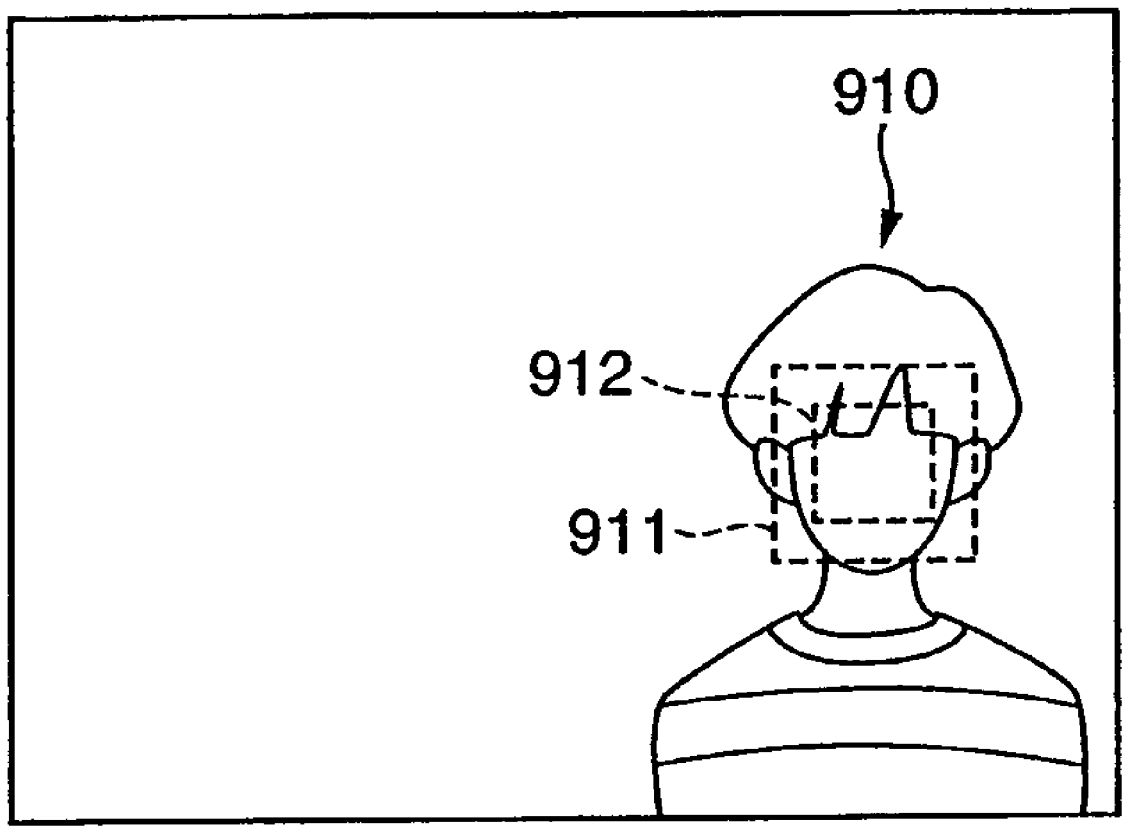

IMAGE CAPTURING APPARATUS WITH LIGHT EMISSION CONTROLLING MECHANISM AND METHOD OF CONTROLLING THE IMAGE CAPTURING APPARATUS

TECHNICAL FIELD

The present invention relates to an image capturing apparatus for capturing, recording, and playing back still and moving pictures, and its control method.

BACKGROUND ART

Conventionally, image processing apparatuses such as electric cameras and the like, which use memory cards having solid-state memory elements as storage media, can store still and moving pictures, and can play back image data stored in the storage media are commercially available. Also, an electric camera which comprises an electric view finder such as a color liquid crystal panel and the like is commercially available.

In these electric cameras, a flash is built in or an independent flash can be mounted as auxiliary light for image capturing in a dark place and environment, so that clear digital photos can be captured even in a dark place such as at night or the like.

A flash device of an electric camera disclosed in Japanese Patent Laid-Open No. 2001-091989 performs pre-emission before main image capturing upon release, calculates the difference between the brightness level and appropriate light control level of an object from a pre-captured image, and determines an emission amount according to the difference upon actual image capturing.

The light control range in this case is generally set to have a focusing area as the center.

FIG. 10 depicts a view for explaining the relationship between a focusing area 912 and light control area 911 on an image capturing frame.

In FIG. 10, since the focusing area 912 and an object 910 overlap each other, a sharp image can be captured even when light control is made based on the light control area 911 having the focusing area 912 as the center. However, in order to capture an image which is in-focus on an object located at the end of the frame, as shown in FIG. 12, after the object 910 is focused, the image capturing range of the camera is moved to capture an image, as shown in FIG. 11. In this case, the object 910 does not match the light control area 910. If light control is made in such state, since the light control is done in an area 920 that does not include any object 910, an image that cannot attain appropriate exposure on the object 910 may be captured.

To solve such problem, Japanese Patent Laid-Open Nos. 2003-107555 and 2003-107567 have proposed a technique for detecting a face of the object 910 from a captured image before AF, and making exposure control or light control by weighting the detected face area of the object. With this arrangement, the face of the object can always be focused without changing any composition after an in-focus state is attained.

However, for example, in a situation with an insufficient brightness (e.g., an image of a person is to be captured to have a nightscape as a background), it is difficult to precisely detect the face of a person from a captured image. As a face detection method of a person, a method of detecting a flesh color area having a predetermined size or larger as a face area, and a method of recognizing a face area by detecting the contour of the face and eye shapes on the basis of brightness information are available. However, with either method, the detection precision undeniably lowers in the dark.

DISCLOSURE OF INVENTION

It is an object of the present invention to solve the conventional problems.

The present invention has been made in consideration of the above situation, and has as its feature to provide an image capturing apparatus and its control method, which can precisely detect the face of a person from a captured image even in a situation with an insufficient brightness of an object, and can realize light control that places an importance on the face of the person.

According to an aspect of the present invention, there is provided with an image capturing apparatus comprising: a lighting determination unit configured to determine whether or not a light emitting unit emits light on the basis of a brightness of an object to be photographed; an area detection unit configured to detect, on the basis of a captured image of the object that receives light emitted by the light emitting unit, an area occupied by a predetermined shape in the captured image; and a control unit configured to control an image capturing operation to obtain a captured image for the purpose of saving, on the basis of information in the area detected by the area detection unit.

According to another aspect of the present invention, there is provided with a method of controlling an image capturing apparatus, comprising:

an area detection step of detecting, on the basis of a captured image based on pre-light emission, an area occupied by a predetermined shape in the captured image; a light control area setting step of setting a light control area of a light emitting unit in the captured image in accordance with the area detected in the area detection step; an arithmetic step of calculating a main light emitting amount in accordance with a photometry value based on the pre-light emission in the light control area; and a control step of controlling to photograph an image by controlling the light emitting unit on the basis of the main light emitting amount calculated in the arithmetic step.

The summary of the invention does not cite all the necessary features and, hence, sub-combinations of these features can be inventions.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

The accompanying drawings, which are incorporated in and constitute a part of the specification, illustrate embodiments of the invention and, together with the description, serve to explain the principles of the invention.

FIG. 12 depicts a view for explaining an object, focusing area, and light control area when the object and focusing area match.

DETAILED DESCRIPTION OF THE PREFERRED EMBODIMENTS

Preferred embodiments of the present invention will be described in detail hereinafter with reference to the accompanying drawings. Note that such embodiments do not limit the invention according to the appended claims, and all combinations of features explained in the embodiment are not always indispensable for means for solving the invention.

Figure 1:
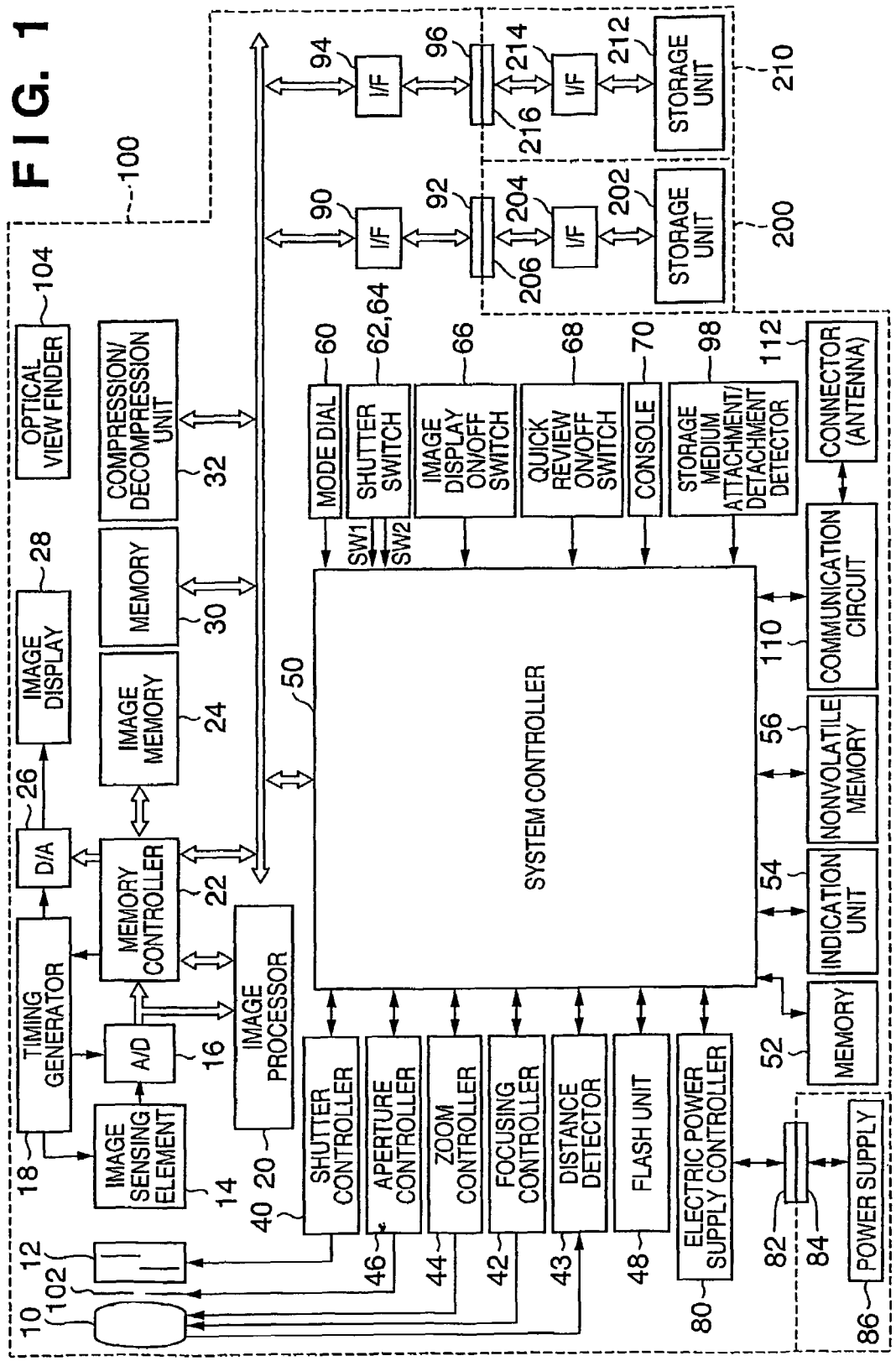
FIG. 1 is a block diagram showing the arrangement of an electric camera according to an embodiment of the present invention.

FIG. 1 is a block diagram showing the arrangement of an electric camera (image processing apparatus) 100 according to the embodiment of the present invention.

Referring to FIG. 1, reference numeral 10 denotes a lens; numeral 12 denotes a shutter; numeral 14 denotes an image sensing element for converting an optical image into an electrical signal; and numeral 16 denotes an A/D converter for converting an analog signal output of the image sensing element 14 into a digital signal. Reference numeral 18 denotes a timing generator for supplying clock signals and control signals to the image sensing element 14, the A/D converter 16, and a D/A converter 26 to control their operations. The timing generator 18 is controlled by a memory controller 22 and system controller 50. An image processor 20 applies a predetermined pixel interpolation process and color conversion process to data from the A/D converter 16 or data from the memory controller 22. Furthermore, the image processor 20 applies predetermined arithmetic processes using captured image data, and the system controller 50 executes a TTL (through the lens metering) AF (auto-focus) process, AE (auto-exposure), and EF (flash pre-emission) process, which control a shutter controller 40 and focusing controller 42, on the basis of the obtained arithmetic result. Moreover, the image processor 20 executes a predetermined arithmetic process using the captured image data, and also executes an AWB (auto-white balance) process on the basis of the obtained arithmetic result. In addition, the image processor 20 executes a face detection process for extracting the edges of the eyes and mouth from the captured image data, and detecting the face of a person.

The memory controller 22 controls the A/D converter 16, the timing generator 18, the image processor 20, an image memory 24, the D/A converter 26, a memory 30, and a compression/decompression circuit 32. With this control, data from the A/D converter 16 is written in the image memory 24 or memory 30 via the image processor 20 and memory controller 22 or directly through the memory controller 22.

The image memory 24 stores data to be displayed on an image display 28, and the data stored in the image memory 24 is output to and displayed on the image display 28 such as a TFT, LCD or the like via the D/A converter 26. When the captured image data are sequentially displayed using the image display 28, an electric view finder function can be implemented. The image display 28 can arbitrarily turn on/off its display function in accordance with an instruction from the system controller 50. When the display function of the image display 28 is turned off, the consumption power of the image processing apparatus 100 can be greatly saved. The memory 30 stores captured still and moving pictures. The memory 30 has a sufficiently large memory size that can store a predetermined number of still pictures and a moving picture for a predetermined period of time. As a result, in case of continuous-photographed photographing or panorama photographing that continuously photograph a plurality of still pictures, write access of a large number of images can be made on the memory 30 at high speed. In addition, the memory 30 can be used as a work area of the system controller 50. The compression/decompression circuit 32 can compress/decompress image data by adaptive discrete cosine transformation (ADCT) or the like. The compression/decompression circuit 32 can execute a compression process by loading an image stored in the memory 30 or a decompression process by loading the compressed image data, and can write the processed data in the memory 30.

The shutter controller 40 controls the shutter 12. The focusing controller 42 controls focusing of the lens 10. The focusing controller 42 detects the object distance based on the focusing position of the lens 10. A zoom controller 44 controls zooming of the lens 10. An aperture controller 46 controls the operation of an aperture 102. A flash unit 48 as a light-emitting device also has a light projection function of AF auxiliary light, and the flash light control function. The shutter controller 40 and focusing controller 42 are controlled using the TTL system, and the system controller 50 controls the shutter controller 40, aperture controller 46, and focusing controller 42 on the basis of the arithmetic results of captured image data by the image processor 20.

The system controller 50 controls the overall image processing apparatus 100. A memory 52 stores constants, variables, programs, and the like required to operate the system controller 50. An indication unit 54 includes liquid crystal display units, loudspeaker, and the like, which are used to indicate operation states, messages, and the like using text, icons, sound, and the like in accordance with execution of programs by the system controller 50. The indication unit 54 is set at one or a plurality of easy-to-see positions around the console of the image processing apparatus 100, and is constructed by a combination of an LCD, LEDs, sound generation element, and the like. Some functions of the indication unit 54 are set within an optical view finder 104. Of the indication contents of the indication unit 54, those displayed on the LCD or the like include, e.g., a single/continuous photographed indication, self timer indication, compression ratio indication, recording pixel count indication, recorded image count indication, remaining recordable image count indication, shutter speed indication, aperture value indication, exposure correction indication, flash indication, pinkeye effect suppression indication, macro photographing indication, buzzer setting indication, remaining timepiece battery capacity indication, remaining battery capacity indication, error indication, information indication using numerals of a plurality of digits, attachment/detachment indication of storage media 200 and 210, communication I/F operation indication, date/time indication, and the like. Of the indication contents of the indication unit 54, those displayed within the optical view finder 104 include, e.g., in-focus indication, blur alert indication, flash charging indication, shutter speed indication, aperture value indication, exposure correction indication, and the like.

A nonvolatile memory 56 is an electrically erasable/programmable memory, which uses, e.g., an EEPROM or the like. A mode dial 60, shutter switches 62 and 64, image display ON/OFF switch 66, quick review ON/OFF switch 68, and console 70 are operation units for inputting various operation instructions of the system controller 50. These operation units are constructed by one or a plurality of combinations of a switch, a dial, a touch panel, a pointer using line of sight detection, a voice recognition device, and the like.

Examples of these operation units will be explained in detail below.

The mode dial switch 60 can selectively set one of various function modes: power OFF, an automatic photographing mode, photographing mode, panorama photographing mode, playback mode, multi-frame playback/erasure mode, PC connection mode, and the like. The shutter switch (SW1) 62 is turned on in the middle of operation of a shutter button (not shown), and instructs to start the AF (auto-focus) process, AE (auto-exposure) process, AWB (auto-white balance) process, and the like. The shutter switch (SW2) 64 is turned on upon completion of operation of the shutter button (not shown), and instructs to start a series of processes including emission control of the flash unit 48, an exposure process for writing a signal read out from the image sensing element 14 as image data in the memory 30 via the A/D converter 16 and memory controller 22, a development process using arithmetic results in the image processor 20 and memory controller 22, and a recording process for reading out image data from the memory 30, compressing the readout data by the compression/decompression circuit 32, and writing the compressed image data in the recording medium 200 or 210, in the flash photographing mode. The image display ON/OFF switch 66 can set ON/OFF of image display on the image display 28. With this function, when current supply to the image display 28 comprising the TFT, LCD and the like is cut off upon photographing using the optical view finder 104, power savings can be attained. The quick review ON/OFF switch sets a quick review function of automatically playing back captured image data immediately after photographing. Note that this embodiment comprises a function of setting a quick review function especially when the image display 28 is turned off. The console 70 includes various buttons, touch panel, and the like, which include a menu button, set button, macro button, multi-frame playback new page button, flash setting button, single-photographed/continuous-photographed/self-timer select button, menu move+(plus) button, menu move−(minus) button, playback image move+(plus) button, playback Image move−(minus) button, photographing image quality select button, exposure correct button, date/time setting button, and the like.

An electric power controller 80 is comprised of a battery detector, DC-DC converter, switch circuit for switching blocks to be energized, and the like. The power controller 80 detects the presence/absence, type, and remaining battery amount of a battery attached, controls the DC-DC converter on the basis of such detection results and an instruction from the system controller 50, and supplies a required voltage to the respective units Including the storage media for a required period of time. Reference numerals 82 and 84 denote connectors. An electric power supply 86 includes a primary battery such as an alkali battery, lithium battery, or the like, a secondary battery such as an NiCd battery, NiMH battery, Li battery, or the like, an AC adapter, and the like.

Reference numerals 90 and 94 denote interfaces with storage media such as a memory card, hard disk, and the like; and numerals 92 and 96 denote connectors for connecting storage media such as a memory card, hard disk, and the like. A storage medium attachment/detachment detector 98 detects whether or not the storage medium 200 or 210 is attached to the connector 92 and/or the connector 96.

Note that this embodiment has two sets of interfaces and connectors that receive the storage media. However, the number of sets of interfaces and connectors that receive the storage media is not particularly limited. Also, combinations of interfaces and connectors of different standards may be used. As the interface and connector, those complying with the standards of a PCMCIA card, CF (Compact Flash) card, and the like may be used.

Furthermore, when the interfaces 90 and 94, and connectors 92 and 96 use those complying with the standards of a PCMCIA card, CF (Compact Flash®) card, and the like, and various communication cards such as a LAN card, modem card, USB card, IEEE1394 card, P1284 card, SCSI card, PHS, and the like are connected thereto, image data and associated management information can be transferred between the image processing apparatus and another computer or its peripheral devices such as a printer and the like.

The aperture 102 determines an exposure amount of the image sensing element 14 in combination with the shutter 12. The optical view finder 104 alone allows photographing without using the electric view finder function implemented by the image display 28. In the optical view finder 104, some functions of the indication unit 54, e.g., an in-focus indication, blur alert indication, flash charging indication, shutter speed indication, aperture value indication, exposure correction indication, and the like are provided. A communication circuit 110 has various communication functions such as RS232C, USB, IEEE1394, P1284, SCSI, modem, LAN, wireless communication, and the like. An antenna (connector) 112 connects the image processing apparatus 100 to another apparatus via the communication unit 110: the connector is used in case of wired connection or the antenna is used in case of wireless communications. The storage medium 200 is a storage medium such as a memory card, hard disk, or the like. The storage medium 200 comprises a storage unit 202 comprised of a semiconductor memory, magnetic disk, or the like, an interface 204 with the image processing apparatus 100, and a connector 206 for connecting the image processing apparatus 100. The storage medium 210 is a storage medium such as a memory card, hard disk, or the like. The storage medium 210 comprises a storage unit 212 comprised of a semiconductor memory, magnetic disk, or the like, an interface 214 with the image processing apparatus 100, and a connector 216 for connecting the image processing apparatus 100.

Figure 2:
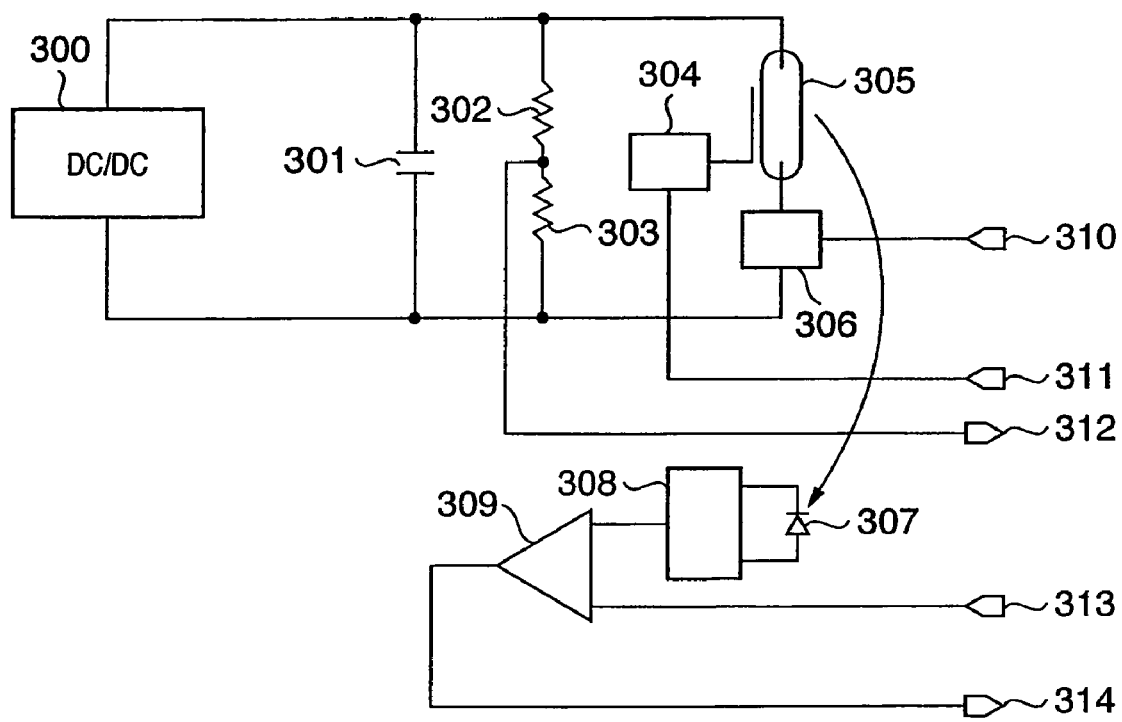
FIG. 2 is a block diagram showing the arrangement of a flash unit of the electric camera according to the embodiment of the present invention.

FIG. 2 is a block diagram for explaining the flash unit 48 according to this embodiment in more detail.

A DC/DC converter 300 boosts a relatively low voltage output from the electric power supply 86 into a high voltage as high as about 300 V. A capacitor 301 is connected in parallel with the output of this DC/DC converter 300, and charges light-emitting energy. Voltage-dividing resistors 302 and 303 divide the charged voltage of the capacitor 301 to monitor it. A light emitter 305 such as an Xe tube or the like emits light when it is excited by a trigger voltage from a trigger unit 304. A current cutoff element 306 is an element used to control light emission of the Xe tube 305, and comprises, e.g., an IGBT. A light-receiving element 307 comprises, e.g., a photodiode or the like, and monitors the light-emitting amount of the Xe tube 305. A compression integrator 308 receives and amplifies a photocurrent output from the light-receiving element 307, and performs logarithmic compression to detect the light-emitting amount of the Xe tube 305. A light-emitting amount comparator 309 detects if the light-emitting amount of the Xe tube 305 is equal to or larger than a predetermined amount, and outputs the detection result. Reference numerals 310 to 314 denote connection terminals to the system controller 50.

The terminal 310 is a light-emission control terminal that controls to start/stop light emission of the Xe tube 305. The terminal 311 is a trigger control terminal that inputs a trigger control signal used to control the trigger unit 304. The terminal 312 is a voltage monitor terminal used to monitor the voltage of the capacitor 301. The terminal 313 is a compare voltage terminal of the comparator 309, which is used to control the light-emitting amount, and the terminal 314 is an output terminal of the comparator.

The operation of the electric camera according to this embodiment will be described below with reference to the flowcharts of FIGS. 3 to 8. Note that a program (900 in FIG. 9) that implements this process is stored in the memory 52, and is executed under the control of the system controller 50. FIG. 9 shows an example of the memory map of the memory 52 (including ROM and RAM). Referring to FIG. 9, reference numeral 907 denotes face data for one face area, which includes face position data and the average brightness of image data of that face area upon detection of the face area, as will be described later. When a plurality of face areas are detected from one image, the face data 907 are stored in correspondence with the number of face areas. Reference numeral 908 denotes an area for storing the calculated average brightness of a plurality of face areas if a plurality of face areas are present.

Figure 3:
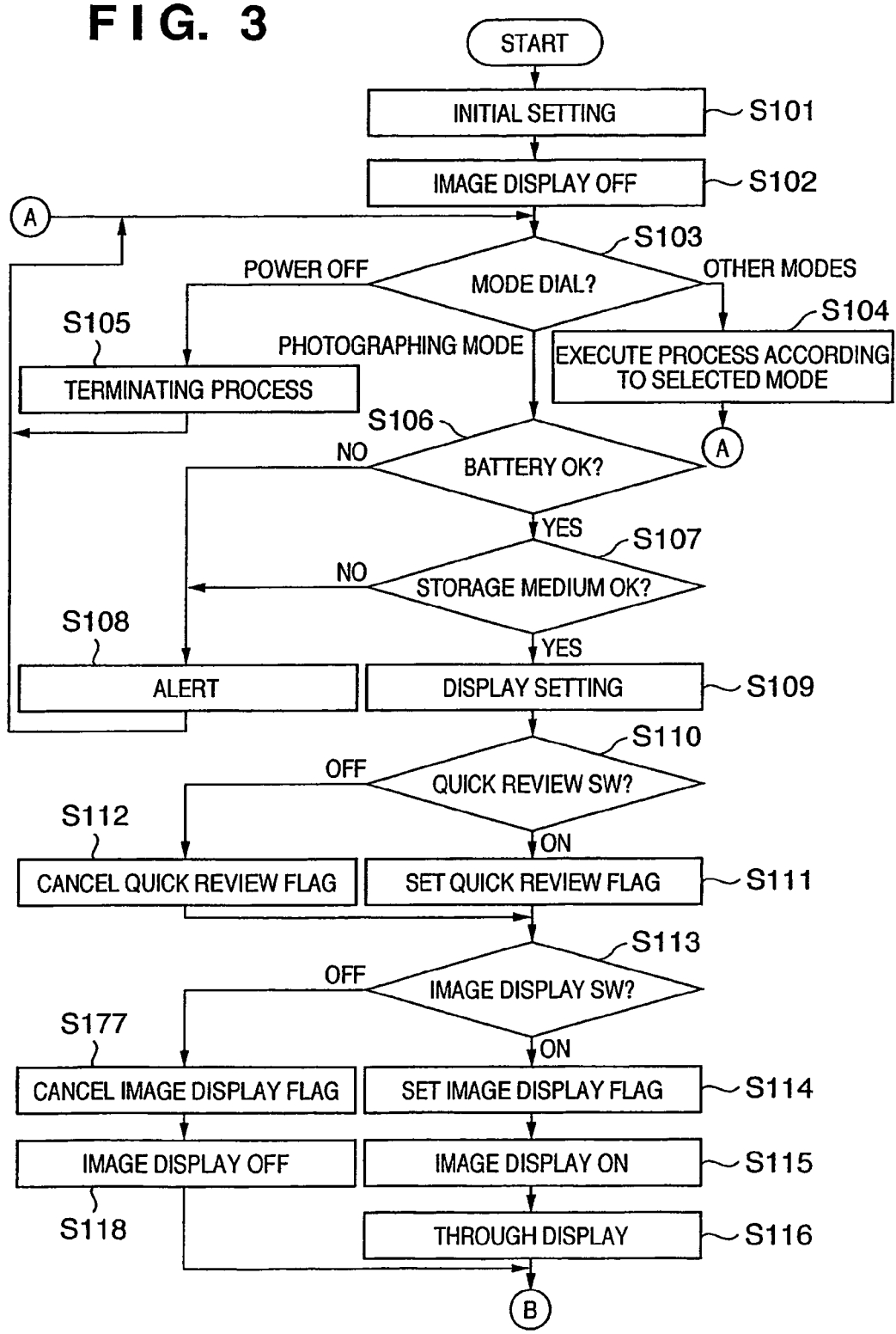
FIG. 3 is a flowchart showing the processing of the main routine of the electric camera according to the embodiment of the present invention.
Figure 4:
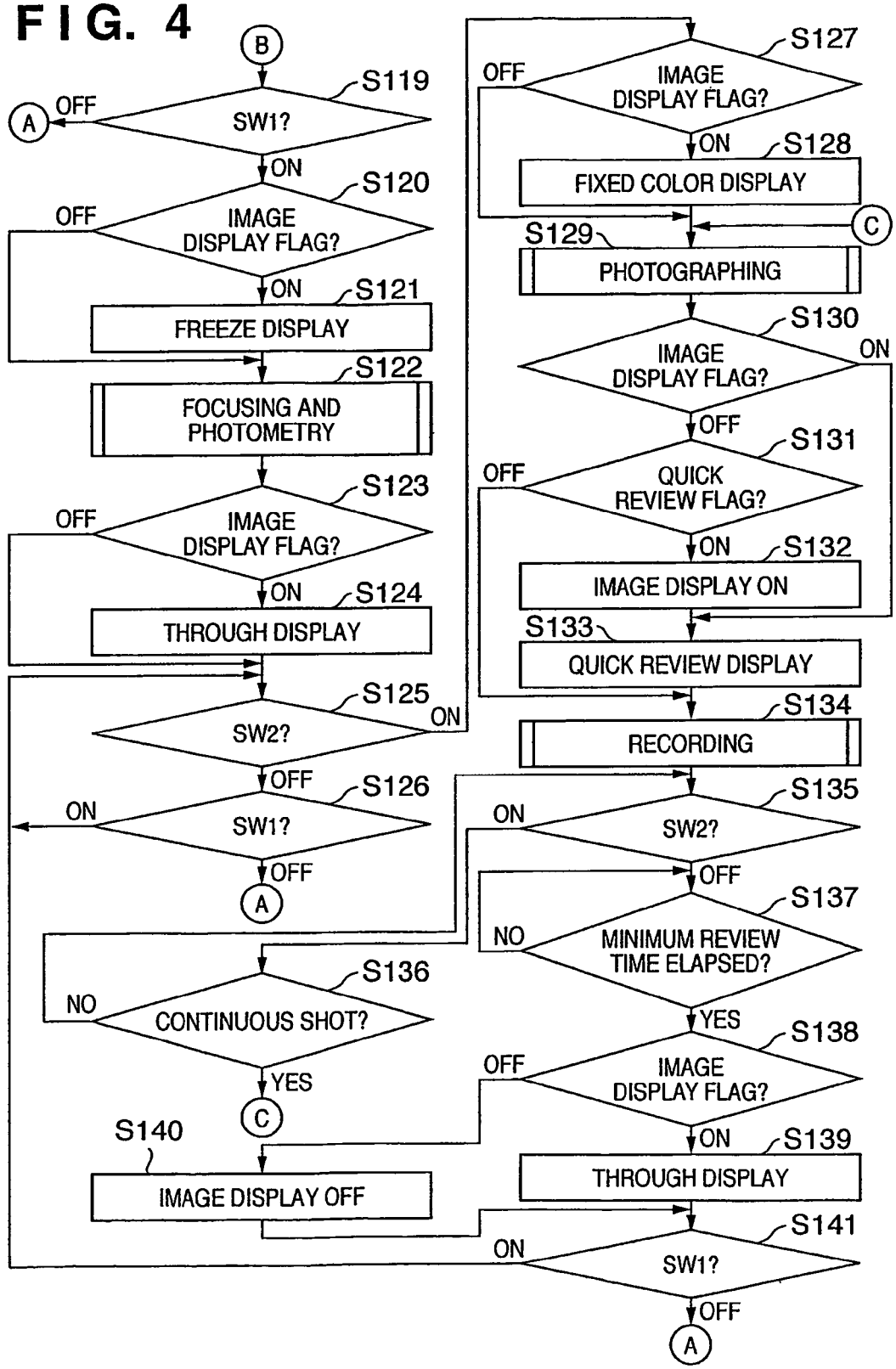
FIG. 4 is a flowchart showing the processing of the main routine of the electric camera according to the embodiment of the present invention.

FIGS. 3 and 4 are flowcharts showing the operation of the main processing routine in the electric camera (image processing apparatus) according to this embodiment. The program for implementing the process as shown in FIGS. 3 to 8 is stored in a program area 900 (ROM) in the memory 52.

This process starts, e.g., upon power ON after battery exchange or the like. The system controller 50 initializes flags, control variables and the like in RAM area of the memory 52 in step S101, and also initializes the image display function of the image display 28 to an OFF state in step S102. The system controller 50 determines the setting position of the mode dial 60 in step S103. If the mode dial 60 is set at the "power OFF" position, the flow advances to step S105, and the system controller 50 executes a predetermined end process, which changes indications of respective indication units to an end state, stores required parameters, setting values, and a setting mode including flags, control variables, and the like in the nonvolatile memory 56, cuts off unnecessary power supplies to respective units of the image processing apparatus 100 including the image display 28 by the power controller 80, and so forth. After that, the flow returns to step S103.

If the mode dial 60 is set at the "photographing mode" position in step S103, the flow advances to step S106. If the mode dial 60 is set at any of other mode positions in step S103, the flow advances to step S104, and the system controller 50 executes a process according to the mode selected by the mode dial 60. Upon completion of the process, the flow returns to step S103.

If the photographing mode is set, the flow advances to step S106, and the system controller 50 determines based on a signal from the power controller 80 whether the remaining capacity and operation state of the power supply 86 comprising batteries and the like pose any problem in the operation of the image processing apparatus 100. If any problem is found, the flow advances to step S108, and a predetermined visual or audible alert indication is made using the indication unit 54. After that, the flow returns to step S103.

If it is determined in step S106 that no problem is found in the power supply 86, the flow advances to step S107, and the system controller 50 determines whether the operation state of the storage medium 200 or 210 poses any problem in the operation of the image processing apparatus 100, in particular, recording/playback of image data to/from the storage medium 200 or 210. If it is determined that any problem is found, the flow advances to step S108, and a predetermined visual or audible alert indication is made using the indication unit 54. After that, the flow returns to step S103.

If it is determined in step S107 that no problem is found, the flow advances to step S109, and the system controller 50 visually and audibly makes UI indications in various setting states of the image processing apparatus 100. If the image display function of the image display 28 is ON, the system controller 50 visually and audibly makes UI indications in various setting states of the image processing apparatus 100 by also using the image display 28. In this manner, various user settings are made.

The system controller 50 checks the state of the quick review ON/OFF switch 68 in step S110. If quick review=ON is set, the flow advances to step Sill, and the system controller 50 sets a quick review flag 901 on the memory 52 to be ON. On the other hand, if quick review=OFF is set using the quick review ON/OFF switch 68, the flow advances to step S112, and the system controller 50 sets the quick review flag 901 on the memory 52 to be OFF. Note that this quick review flag 901 is stored on the internal memory of the system controller 50 or the memory 52, and a case will be explained below wherein the flag 901 is set on a RAM area of the memory 52, as shown in FIG. 9. The same applies to other flags.

The flow advances to step S113, and the system controller 50 checks the setting state of the image display ON/OFF switch 66. If image display=ON is set, the flow advances to step S114, the system controller 50 sets an image display flag 902 on the memory 52 to be ON, sets the image display function of the image display 28 to an ON state in step S115, and also sets it in a through display state that sequentially displays captured image data in step S116. The flow then advances to step S119 (FIG. 4). In the through display state, data which are sequentially written in the image memory 24 via the image sensing element 14, A/D converter 16, image processor 20, and memory controller 22, are sequentially displayed on the image display 28 via the memory controller 22 and D/A converter 26, thus implementing an electric view finder function.

If the image display ON/OFF switch 66 is set to be image-display=OFF in step S113, the flow advances to step S117. The system controller 50 sets the image display flag 902 to be OFF in step S117, and sets the image display function of the image display 28 to an OFF state in step S118. The flow then advances to step S119. If image display=OFF, photographing is made using the optical view finder 104 without using the electric view finder function implemented by the image display 28. In this case, the consumption power of the image display 28, D/A converter 26, and the like which consume large electric power can be reduced. Note that the image display flag 902 is stored in the internal memory of the system controller 50 or the memory 52.

The system controller 50 determines in step S119 whether the shutter switch (SW1) 62 is ON. If the shutter switch (SW1) 62 is OFF, the flow returns to step S103. However, if the shutter switch (SW1) 62 is ON, the flow advances to step S120, and the system controller 50 checks if the image display flag 902 stored in the internal memory of the system controller 50 or the memory 52 is set to be ON. If the image display flag 902 is set to be ON, the flow advances to step S121, and the system controller 50 sets the display state of the image display 28 in a freeze display state. After that, the flow advances to step S122. In the freeze display state, image data in the image memory 24 is inhibited from being rewritten via the image sensing element 14, A/D converter 16, image processor 20, and memory controller 22, and image data written last is displayed on the image display 28 via the memory controller 22 and D/A converter 26, thus displaying a frozen picture on the electric view finder 104.

If it is determined in step S120 that the image display flag 902 is OFF, the flow advances to step S122. The system controller 50 performs a focusing process for bringing the lens 10 into focus on an object, and also executes a photometry process to determine the aperture value and shutter speed in step S122. In the photometry process, the system controller 50 also makes flash settings. Details of the process of focusing and photometry processes (S122) will be described later using FIG. 5.

Upon completion of the focusing and photometry processes in step S122, the flow advances to step S123, and the system controller 50 checks the status of the image display flag 902 stored in its internal memory or the memory 52. If the image display flag 902 is set to be ON, the flow advances to step S124, and the system controller 50 sets the display state of the image display 28 in a through display state. After that, the flow advances to step S125. Note that the through display state in step S124 is the same operation state as the through state in step S116.

If the shutter switch SW2 is not pressed in step S125, and the shutter switch SW1 is also canceled, the flow returns to step S103 (FIG. 3).

If the shutter switch (SW2) 64 is pressed in step S125, the flow advances to step S127, and the system controller 50 checks if the image display flag 902 stored in its internal memory or the memory 52 is ON. If the image display flag 902 is ON, the flow advances to step S128, and the system controller 50 sets the display state of the image display 28 in a fixed color display state. After that, the flow advances to step S129. In the fixed color display state, fixed-color image data is displayed on the image display 28 via the memory controller 22 and D/A converter 26 in place of photographed image data, which is written in the image memory 24 via the image sensing element 14, A/D converter 16, image processor 20, and memory controller 22, thus displaying a fixed-color image on the electric view finder 104.

If the image display flag 902 is OFF in step S127, the flow advances to step S129. In step S129, the system controller 50 executes a photographing process including an exposure process for writing photographed image data in the memory 30 via the image sensing element 14, A/D converter 16, image processor 20, and memory controller 22 or directly from the A/D converter 16 via the memory controller 22, and a development process for performing various processes by reading out image data written in the memory 30 using the memory controller 22 and the image processor 20 as needed.

Details of this photographing process (S129) will be described later using FIGS. 6 and 7.

Upon completion of the photographing process in step S129, the flow advances to step S130, and the system controller 50 checks if the image display flag 902 stored in its internal memory or the memory 52 is ON. If the image display flag is ON, the flow advances to step S133, and the system controller 50 makes quick review display. In this case, the image display 28 is always enabled as the electric view finder, and quick review display is also made immediately after photographing.

If the image display flag 902 is OFF in step S130, the flow advances to step S131, and the system controller 50 determines whether the quick review flag 901 stored its internal memory or the memory 52 is ON. If the quick review flag 901 is ON, the flow advances to step S132, and the system controller 50 sets the image display function of the image display 28 to an ON state to make quick review display (S133). After that, the flow advances to step S134.

If the image display flag 902 is OFF in step S130 and the quick review flag 901 is also OFF in step S131, the flow jumps to step S134 while keeping the image display 28 in an OFF state. In this case, the image display 28 is kept disabled even after photographing, and no quick review display is made. This use method does not require any confirmation of a captured image immediately after photographing and attaches an importance on power savings like in a case wherein photographing is continued using the optical view finder 104.

In step S134, the system controller 50 executes various image processes by reading out photographed image data written in the memory 30 using the memory controller 22 and the image processor 20 as needed, and also an image compression process according to a mode set using the compression/decompression circuit 32, and then executes a recording process for writing image data on the storage medium 200 or 210. Details of this recording process (S134) will be described later using FIG. 8.

Upon completion of the recording process in step S134, the system controller determines in step S135 whether the shutter switch (SW2) 64 is ON. If the shutter switch (SW2) 64 is ON, the flow advances to step S136, and the system controller 50 checks the status of a continuous-photographed flag 903 stored in its internal memory or the memory 52. If the continuous-photographed flag 903 is ON, the flow returns to step S129 to make the next photographing. If the continuous-photographed flag 903 is not ON in step S136, the flow advances to step S137, and the system controller 50 repeats the processes in steps S135 and S136 until the shutter switch (SW2) 64 is released.

As described above, according to this embodiment, In the operation setting state that is required to make quick review display immediately after photographing, if the shutter switch (SW2) is pressed upon completion of the recording process (S134), the quick review display is continued on the image display 28 until the shutter switch (SW2) is released. In this way, the captured image can be confirmed carefully.

If the shutter switch (SW2) 64 is OFF immediately after the recording process in step S134, or if the shutter switch (SW2) 64 is kept ON to continue quick review display and a photographed image is confirmed after the recording process in step S134, and the shutter switch (SW2) 64 is then released, the flow advances from step S135 to step S137 to wait for an elapse of a predetermined minimum review time. After that, the flow advances to step S138. The system controller 50 determines in step S138 whether the image display flag 902 is ON. If the image display flag is ON, the flow advances to step S139, and the system controller 50 sets the display state of the image display 28 in a through display state. After that, the flow advances to step S141. In this way, after a photographed image is confirmed by the quick review display on the image display 28, the through display state that sequentially displays image data captured for the next photographing can be set. If the image display flag is OFF in step S138, the flow advances to step S140, and the system controller 50 sets the display state of the image display 28 to an OFF state. After that, the flow advances to step S141. In this way, after a photographed image is confirmed by the quick review display on the image display 28, the function of the image display 28 is disabled to attain power savings, thus reducing the consumption power of the image display 28, D/A converter 26, and the like which consume large electric power.

The system controller 50 determines in step S141 whether the shutter switch SW1 is ON. If the shutter switch SW1 is ON, the flow returns to step S125, and the system controller 50 prepares for the next photographing. If the shutter switch SW1 is OFF in step S141, the system controller 50 ends a series of photographing operation, and the flow returns to step S103 (FIG. 3).

Figure 5:
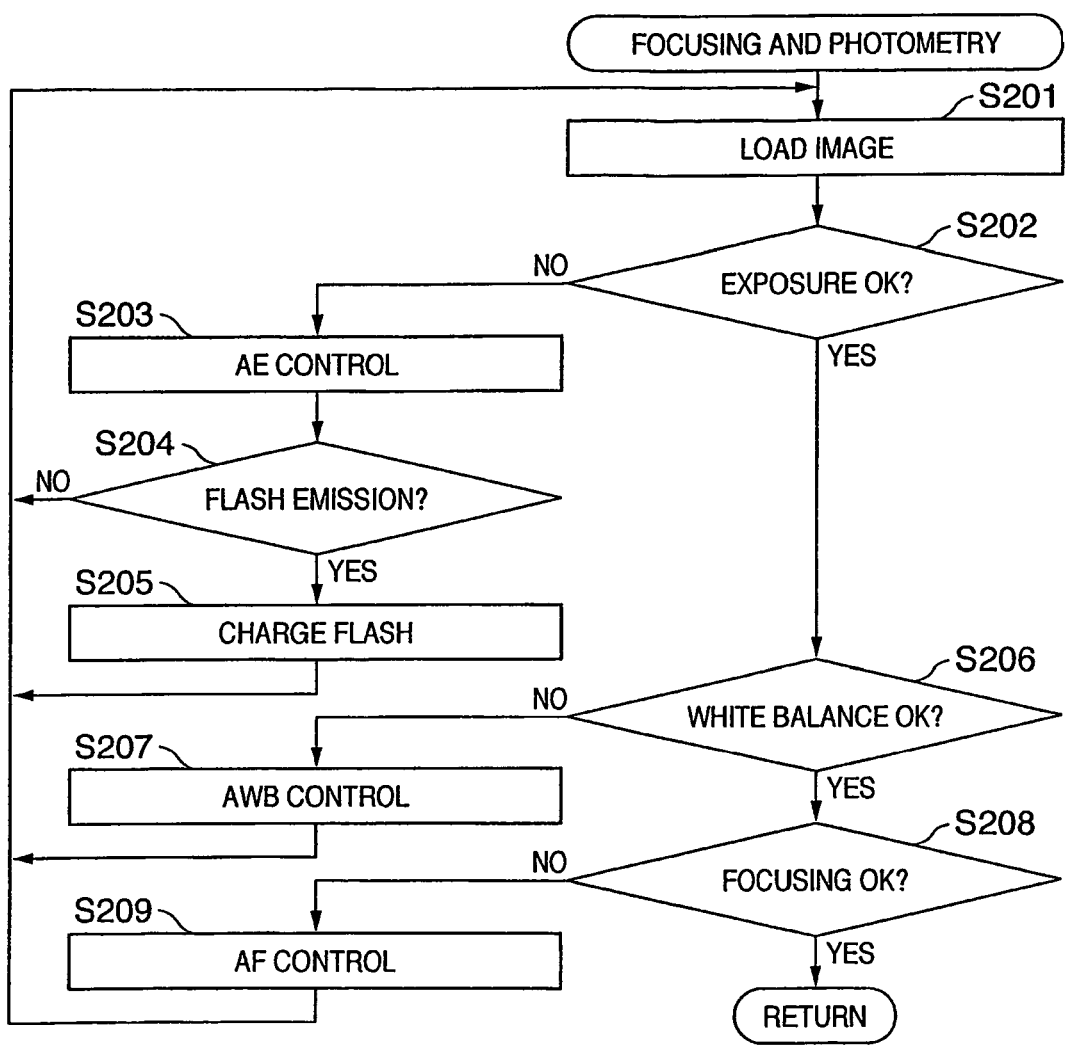
FIG. 5 is a flowchart showing the focusing and photometry processes of the electric camera according to the embodiment of the present invention.

FIG. 5 is a flowchart showing details of the focusing and photometry processes in step S122 in FIG. 4.

In step S201, the system controller 50 reads out a charge signal from the image sensing element 14, converts the charge signal into digital data via the A/D converter 16, and inputs the digital data to the image processor 20. The image processor 20 performs predetermined arithmetic operations used in the TTL (through-the-lens) AE (auto-exposure) process, EF (flash pre-emission) process, and AF (auto-focus) using the input image data. Note that respective processes in this case extract a required number of specific portions from all photographed pixels and use them in arithmetic operations. In this way, arithmetic operations optimal to each of a center-weighted mode, average mode, and evaluation mode can be made in the TTL AE, EF, AWB, and AF processes.

If it is determined in step S202 using the arithmetic results of the image processor 20 in step S201 that an exposure (AE) value is inappropriate, the flow advances to step S203, and the system controller 50 performs AE control using the combination of the aperture controller 46 and image sensing element 14, i.e., an electric shutter. The system controller 50 determines in step S204 using measurement data 905 (FIG. 9) associated with an object brightness obtained by this AE control whether flash is required or not. If it is determined that the flash is required, the flow advances to step S205, and the system controller 50 sets a flash flag 904 and charges the flash unit 48. After that, the flow returns to step S201.

If it is determined in step S202 that an exposure (AE) value is appropriate, the flow advances to step S206, and the system controller 50 stores measurement data 905 and/or setting parameters 906 in its internal memory or the memory 52 (FIG. 9 shows a storage example in the memory 52). Using the arithmetic results of the image processor 20 and the measurement data obtained by the AE control, the system controller 50 determines whether white balance (AWB) is appropriate or not. If it is determined that the white balance (AWB) is inappropriate, the flow advances to step S207, and the system controller 50 performs AWB control by adjusting color process parameters using the image processor 20. After then, the flow returns to step S201.

If it is determined in step S206 that the white balance (AWB) is appropriate, the flow advances to step S208, and the system controller 50 stores the measurement data 905 and/or setting parameters 906 in its internal memory or the memory 52. Using the measurement data 905 obtained by the AE control and AWB control, the system controller 50 determines if the focusing (AF) result indicates an in-focus state. If the focusing (AF) result does not indicate an in-focus state, the flow advances to step S209, and the system controller 50 performs AF control using the focusing controller 42. After then, the flow returns to step S201. If it is determined in step S208 that the focusing (AF) result indicates an in-focus state, the system controller 50 stores the measurement data 905 and/or setting parameters 906 in its internal memory or the memory 52, thus ending the focusing and photometry processes.

Figure 6:
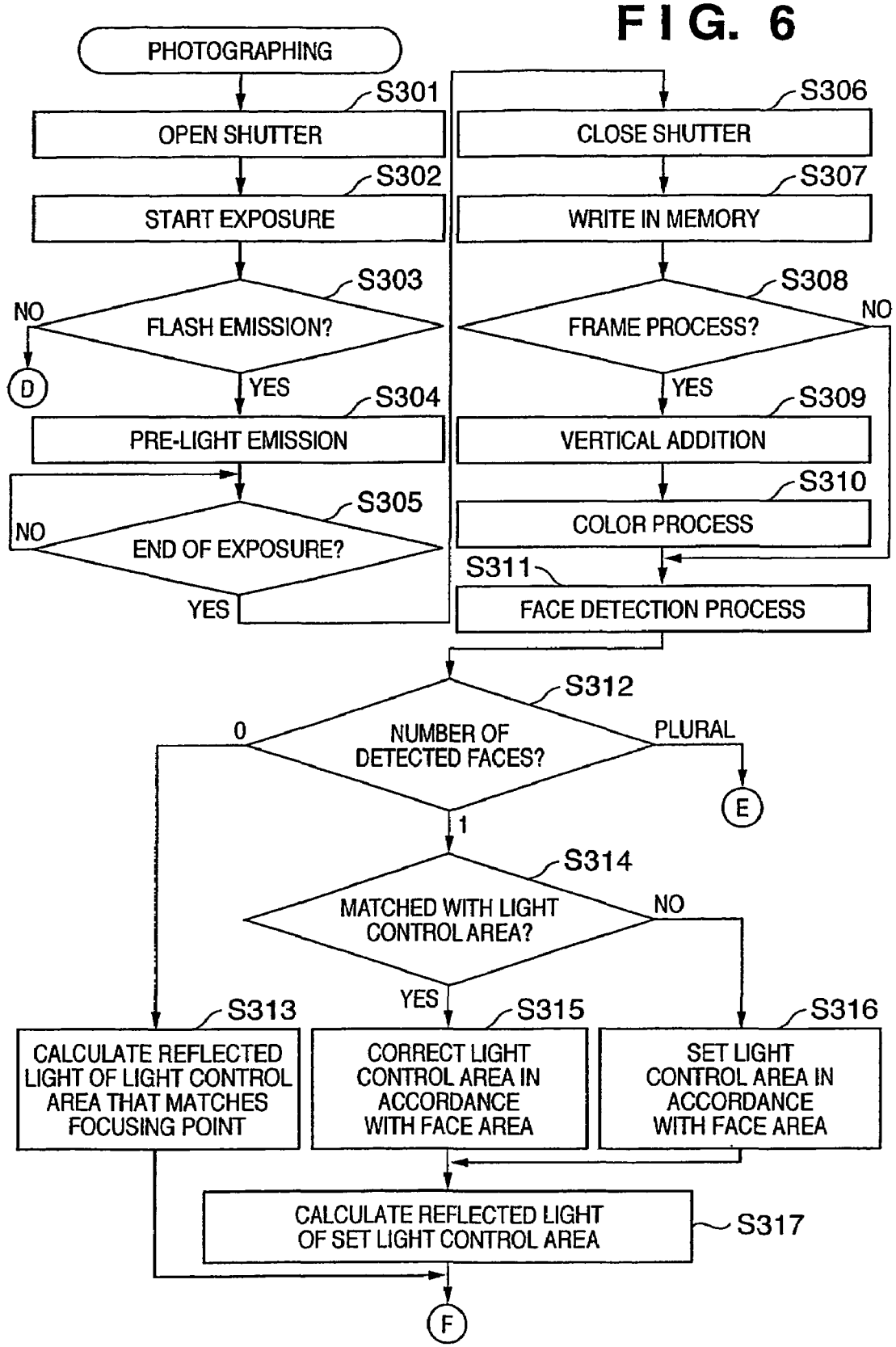
FIG. 6 is a flowchart for explaining the image capturing process of the electric camera according to the embodiment of the present invention.
Figure 7:
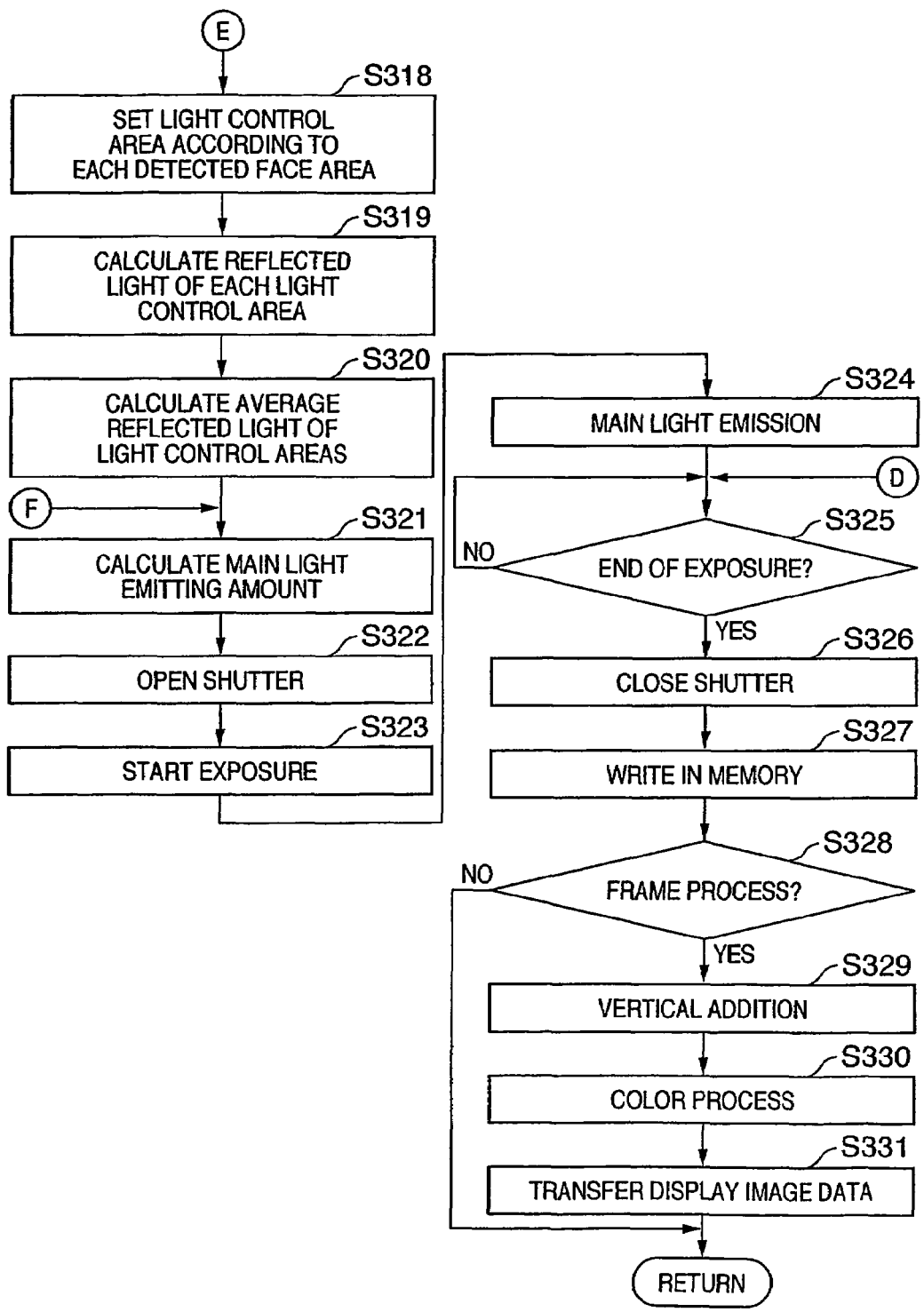
FIG. 7 is a flowchart for explaining the image capturing process of the electric camera according to the embodiment of the present invention.

FIGS. 6 and 7 are flowcharts showing details of the photographing process in step S129 in FIG. 4.

The system controller 50 controls the aperture controller 46 to set an aperture value in accordance with the photometry data 905 stores in the internal memory of the system controller 50 or the memory 52, and controls the shutter controller 40 to open the shutter 12, thus exposing the image sensing element 14 (S301 and S302).

The system controller 50 checks based on the flash flag 904 in step S303 if the flash unit 48 is required. If it is determined that the flash unit 48 is required, the flow advances to step S304, and the system controller 50 controls the flash unit 48 to perform pre-light emission with a predetermined light-emitting amount. The light amount of pre-light emission is determined on the basis of the aperture value of the lens 10, the distance to an object detected by a distance detector 43, and the set sensitivity of the image sensing element 14. The system controller 50 waits for end of exposure of the image sensing element 14 in accordance with the photometry data 905 in step S305, and closes the shutter 12 in step S306 if the exposure end timing is reached. In step S307, the system controller 50 reads out a charge signal from the image sensing element 14, and writes photographed image data in the memory 30 via the A/D converter 16, image processor 20, and memory controller 22 or directly from the A/D converter 16 via the memory controller 22.

The flow then advances to step S308, and the system controller 50 determines whether a frame process is required in accordance with the set photographing mode. If it is determined that the frame process is required, the flow advances to step S309; The system controller 50 reads out image data stored in the memory 30, sequentially performs a vertical addition process in step S309 and color process in step S310, and then executes a face detection process in step S311 using the memory controller 22 and the image processor 20 as needed. The face detection process by the image processor 20 detects the face position of a person by extracting features, i.e., the edges of the eyes and mouth, detects the contour of the face that contains the eyes and mouth to calculate its barycentric position, and then calculates the brightness (image signal level) in the contour area. Note that this face detection process improves its detection precision by predicting the size of the face of a person on the basis of the distance detected by the distance detector 43 from the focusing position of the lens 10 and the focal length of the lens.

In step S312, the system controller 50 determines the number of faces detected in step S311. If the number of faces is "0", the flow branches to step S313, if it is "1", the flow branches to step S314, or if a plurality of faces are detected, the flow branches to step S318. If no face is detected, i.e., if the number of detected faces is "0", the system controller 50 calculates the average brightness (image signal level) value in the light control area that matches a focusing point in step S313, as has been set in advance, and the flow advances to step S321 (FIG. 7).

If the number of detected faces is "1", the system controller 50 determines in step S314 whether the detected face position matches the pre-set light control area. If it is determined that they match, the flow advances to step S315, and the system controller 50 corrects the light control area in accordance with the area of the detected face. If it is determined that the detected face position does not match the pre-set light control area, the flow branches to step S316. In step S316, the system controller 50 sets the detected face position (an area based on the face position data in FIG. 9) as a new light control area, and sets the light control area in accordance with the area of the detected face. After execution of step S315 or S316, the flow advances to step S317, and the system controller 50 calculates the average value (the average brightness of the face area in FIG. 9) of the brightness values (image signal levels) in the light control area set in step S315 or S316. The flow then advances to step S321 (FIG. 7).

If a plurality of faces are detected by the face detection process in step S312, the flow advances to step S318 (FIG. 7), and the system controller 50 sets a plurality of light control areas in accordance with the face position data of these detected faces, and the areas of the respective faces. The system controller 50 then calculates the average values of the brightness values (image signal levels) in the respective face areas (light control areas), and stores these average values as the face data (average brightness) 907 of respective faces shown in FIG. 9 in step S319. Furthermore, the system controller 50 further averages the average values of the plurality of detected light control areas, and stores the average value in the area 908 for storing the average brightness of a plurality of faces in FIG. 9 in step S320. The flow then advances to step S321.

In this manner, in step S321 the system controller 50 calculates a main light-emitting amount (a light-emitting amount upon actual photographing) which can attain an appropriate brightness (appropriate image signal level) in each light control area. For example, the system controller 50 performs the following process. That is, if the image signal level of pre-photographing based on pre-light emission is an appropriate level, the same light-emitting amount as that of pre-light emission can be set. For example, if the image signal level of pre-photographing is lower by one level than the appropriate level, a light-emitting amount twice that of pre-light emission is set.

For main photographing, the system controller 50 controls the shutter controller 40 to open the shutter 12 in step S322, and exposes the image sensing element 14 in step S323. The flow advances to step S324, and the system controller 50 controls the flash unit 48 to perform main light emission with the main light-emitting amount calculated in step S321.

The system controller 50 waits for a time required until end of exposure of the image sensing element 14 in accordance with photometry data in step S325, and closes the shutter 12 in step S326. In step S327, the system controller 50 reads out a charge signal from the image sensing element 14, and writes photographed image data in the memory 30 via the A/D converter 16, image processor 20, and memory controller 22 or directly from the A/D converter 16 via the memory controller 22, so that the photographed image data can be saved. The system controller 50 determines in step S328 whether a frame process is required in accordance with the set photographing mode. If a frame process is required, the flow advances to step S329. The system controller 50 reads out image data written in the memory 30, sequentially performs a vertical addition process in step S329 and color process in step S330, and then writes the processed image data in the memory 30. In step S331, the system-controller 50 reads out image data from the memory 30, and transfers display image data to the image memory 24 via the memory controller 22. Upon completion of a series of processes, the photographing process routine (S129) ends.

Figure 8:
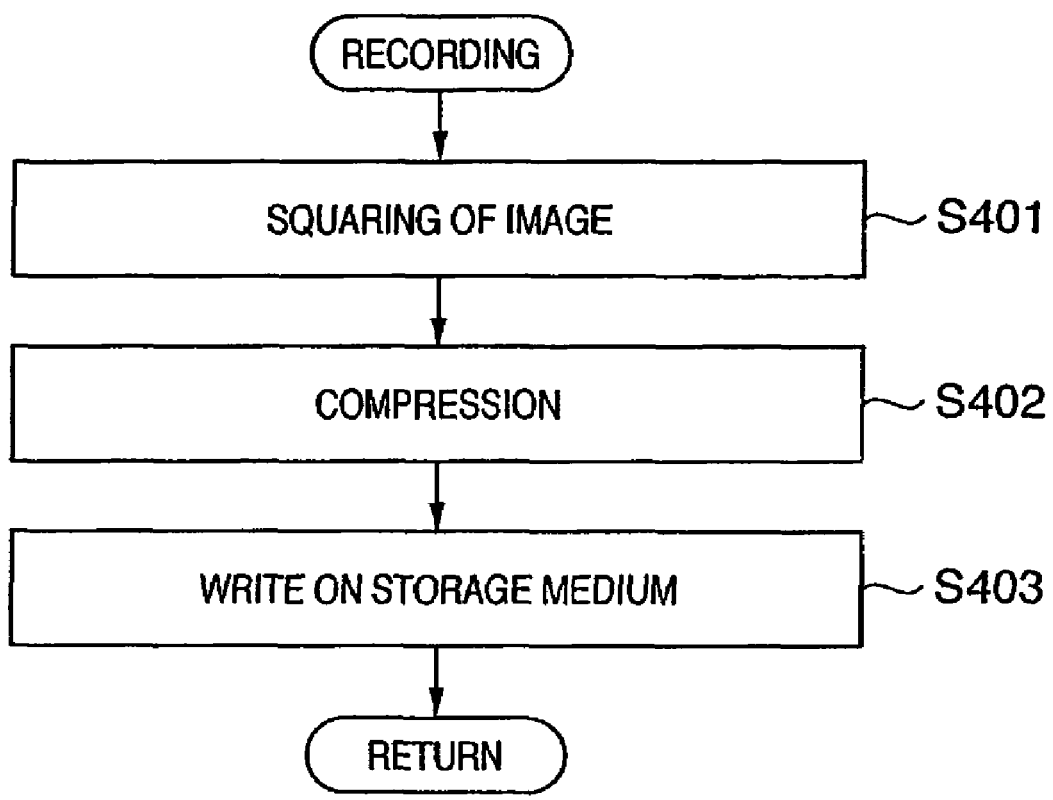
FIG. 8 is a flowchart for explaining the recording process of the electric camera according to the embodiment of the present invention.
Figure 9:
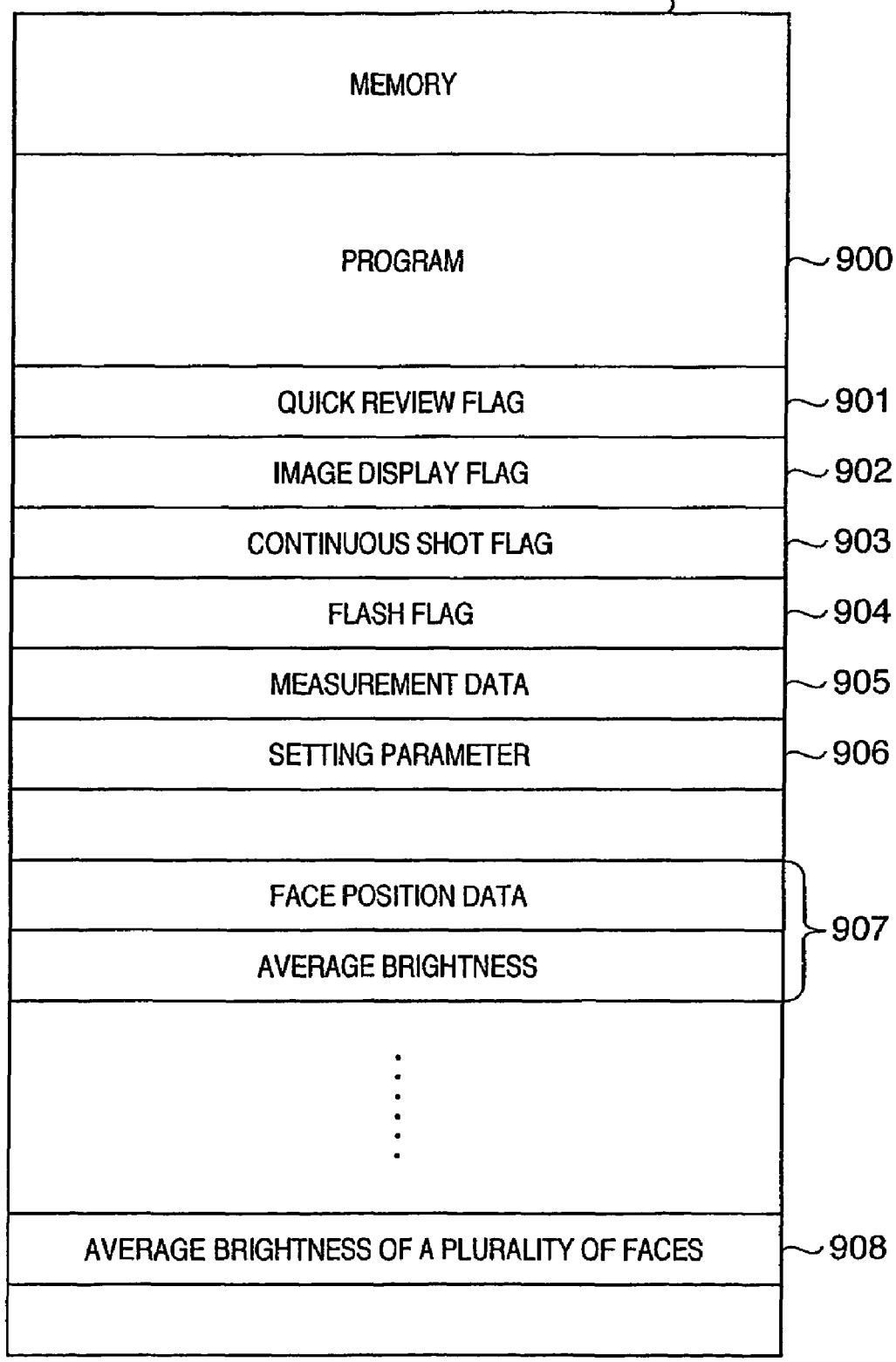
FIG. 9 depicts an example of the memory map of a memory of the electric camera according to the embodiment of the present invention.
Figure 10:
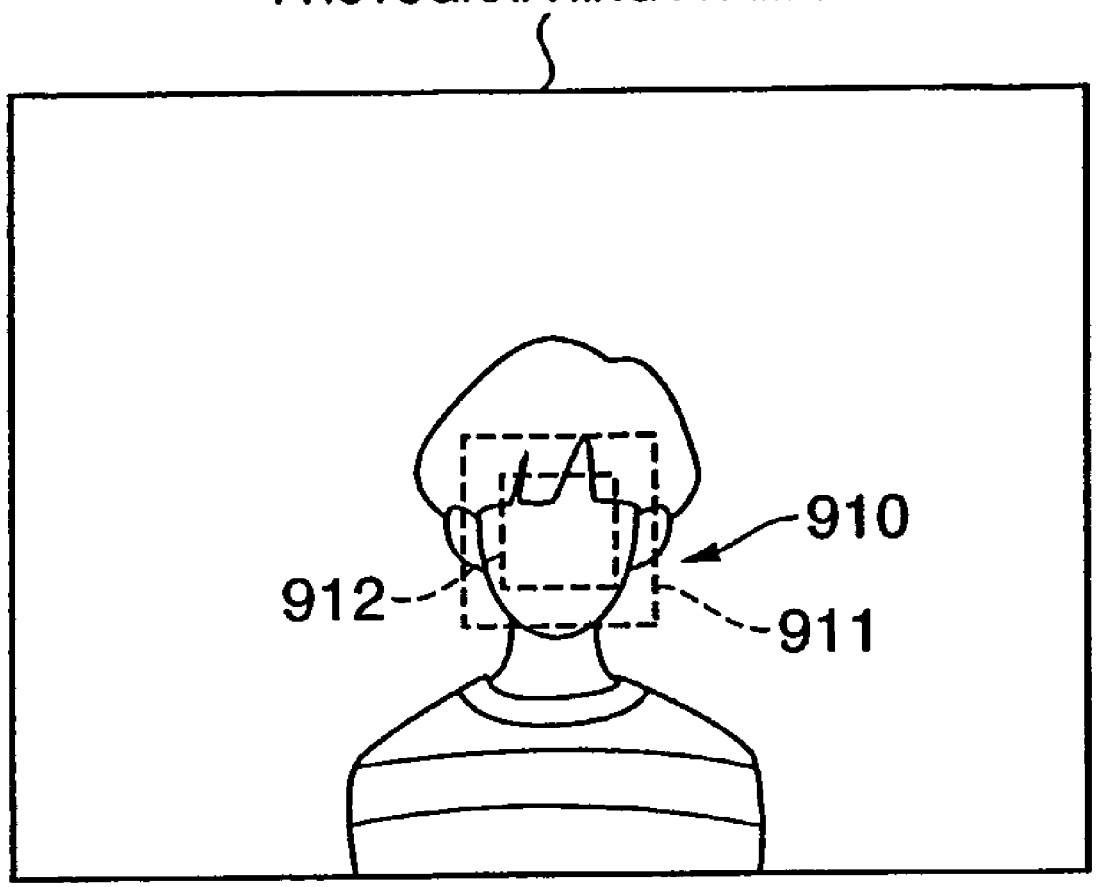
FIG. 10 depicts a view for explaining an object, focusing area, and light control area when the object and focusing area match.
Figure 11:
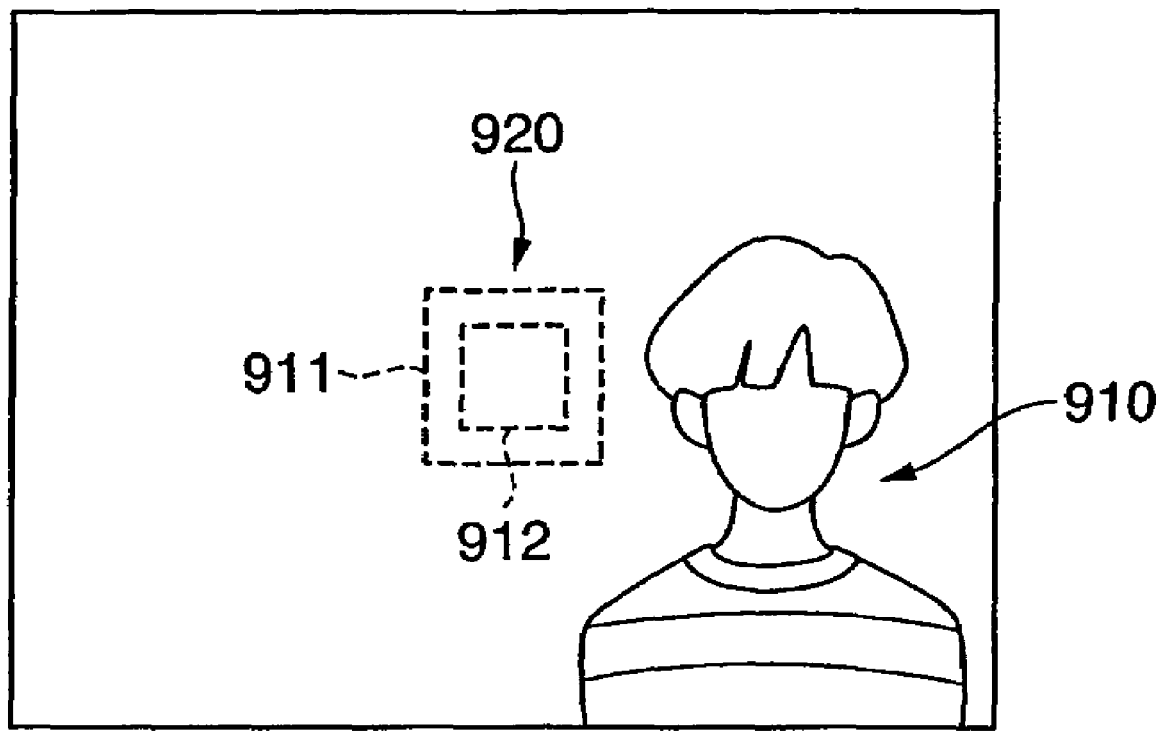
FIG. 11 depicts a view for explaining an object, focusing area, and light control area when the object and focusing area do not match.

FIG. 8 is a flowchart showing details of the recording process in step S134 in FIG. 4.

The system controller 50 reads out photographed image data stored in the memory 30 using the memory controller 22 and the image processor 20 as needed, applies a pixel squaring process that interpolates the aspect ratio of pixels to "1:1" in step S401, and then writes the processed image data into the memory 30. The system controller 50 reads out image data stored in the memory 30, and performs an image compression process using the compression/decompression circuit 32 in accordance with the set mode in step S402. In step S403, the system controller 50 writes the compressed image data on the storage medium 200 or 210 (such as a memory card, Compact Flash™ card, or the like) via the interface 90 or 94 and connector 92 or 96. Upon completion of the write process on the storage medium, the system controller 50 ends the recording process routine S134.

In this embodiment, the light control area is set in accordance with the face position and size detected by the image processing apparatus 100. However, since such face position may be erroneously detected, an appropriate brightness value obtained when the reflectance of the face is 25% may be calculated on the basis of the object distance detected by the distance detector 43 that detects the distance to an object, the light-emitting value of pre-light emission, the aperture value, and ISO speed. If the brightness value of the detected face position falls within a desired range, then the detected face position may be used as the light control area; if the brightness value of the detected face position falls outside that range, then a detection error may be determined, and the pre-set light control area may be used, or an area with a highest brightness on the frame may be used as the light control area.

In this case, if the appropriate brightness value according to the object distance is compared with a high-brightness area in the frame, and is higher than a desired brightness range, the high-brightness area is determined as an abnormal reflection area such as a glass, mirror, or the like, and is excluded from the light control area, thus setting the light control area more precisely. Upon face detection, a face area can be detected more precisely by recognizing hue of an object.

Moreover, in this embodiment, the face of a person is detected, and undergoes light control. However, the present invention is not limited to the face of a person as long as a shape can be specified by extracting features from captured image data, and a predetermined pose of a person, a face of an animal, and the like can be detected.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As many apparently widely different embodiments of the present invention can be made without departing from the spirit and scope thereof, it is to be understood that the invention is not limited to the specific embodiments thereof except as defined in the claims.

The invention claimed is:

1. An image capturing apparatus comprising:
   an area detection unit configured to detect, on the basis of a captured image of an object photographed based on pre-light emission prior to a main light emission, an edge in the captured image of the object to determine an area occupied by a predetermined shape defined by the edge in the captured image of the object;
   a light control area setting unit configured to set a light control area of a light emitting unit in the captured image in accordance with the area determined by said area detection unit;
   an arithmetic unit configured to calculate a main light emitting amount in the main light emission in accordance with a photometry value based on the pre-light emission in the light control area of the captured image of the object; and
   a control unit configured to control to photograph the object in the main light emission by controlling the light emitting unit on the basis of the main light emitting amount calculated by said arithmetic unit.

2. The apparatus according to claim 1, wherein the predetermined shape corresponds to a shape of a face of a person.

3. The apparatus according to claim 1, further comprising a focusing unit configured to measure a distance to the object to be photographed, and wherein said light control area setting unit sets the light control area in accordance with the distance measured by said focusing unit, and the area detected by said area detection unit.

4. The apparatus according to claim 3, wherein an irradiation light amount upon the pre-light emission is adjusted on the basis of the distance measured by said focusing unit, a set aperture value, and sensitivity of an image sensing element.

5. The apparatus according to claim 3, wherein in a case where it is determined that the area set in accordance with the distance measured by said focusing unit does not match the area determined by said area detection unit, said light control area setting unit adjusts the area in accordance with the distance measured by said focusing unit to the area determined by said area detection unit and sets the adjusted area as a light control area.

6. The apparatus according to claim 3, wherein the distance is adjusted based on a focusing position of a lens.

7. The apparatus according to claim 1, wherein said arithmetic unit calculates an average brightness value based on the pre-light emission in the adjusted light control area, and calculates the main light emitting amount on the basis of the average brightness value.

8. The apparatus according to claim 1, wherein in a case where said area detection unit determines a plurality of areas, said arithmetic unit calculates average brightness values based on the pre-light emission in the respective detected areas, calculates an average value of brightness values of the plurality of face areas from the average brightness values, and calculates the main light emitting amount on the basis of the average value.

9. A method of controlling an image capturing apparatus, comprising:
   an area detection step of detecting, on the basis of a captured image of an object photographed based on pre-light emission prior to a main light emission, an edge in the captured image of the object to determine an area occupied by a predetermined shape defined by the edge in the captured image of the object;
   a light control area setting step of setting a light control area of a light emitting unit in the captured image in accordance with the area determined in said area detection step;
   an arithmetic step of calculating a main light emitting amount in the main light emission in accordance with a photometry value based on the pre-light emission in the light control area of the captured image of the object; and
   a control step of controlling to photograph the object in the main light emission by controlling the light emitting unit on the basis of the main light emitting amount calculated in the arithmetic step.

10. The method according to claim 9, wherein the predetermined shape corresponds to a shape of a face of a person.

11. The method according to claim 9, further comprising a focusing step of measuring a distance to the object to be photographed, and wherein the light control area setting step includes a step of setting the light control area in accordance with the distance measured in the focusing step, and the area detected in said area detection step.

12. The method according to claim 11, wherein an irradiation light amount upon the pre-light emission is adjusted on the basis of the distance measured in said focusing step, a set aperture value, and sensitivity of an image sensing element.

13. The method according to claim 11, wherein said light control area setting step includes a step of adjusting, in a case where it is determined that the area set in accordance with the distance measured in said focusing step does not match the area determined in said area detection step, the area in accordance with the distance measured in said focusing step to the area determined in said area detection step, and setting the adjusted area as a light control area.

14. The method according to claim 11, wherein the distance is adjusted based on a focusing position of a lens.

15. The method according to claim 9, wherein said arithmetic step includes a step of calculating an average brightness value based on the pre-light emission in the adjusted light control area, and calculating the main light emitting amount on the basis of the average brightness value.

16. The method according to claim 9, wherein said arithmetic step includes a step of calculating, in a case where a plurality of areas are determined in said area detection step, average brightness values based on the pre-light emission in the respective detected areas, calculating an average value of brightness values of the plurality of face areas from the average brightness values, and calculating the main light emitting amount on the basis of the average value.

17. A computer readable storage medium storing a program for causing a computer to implement a control method of claim 9.

* * * * *